INVENTOR.
DANIEL C. LAVIERI
WILLIAM J. HAWLEY
BY Joseph M. Schofield
ATTORNEY

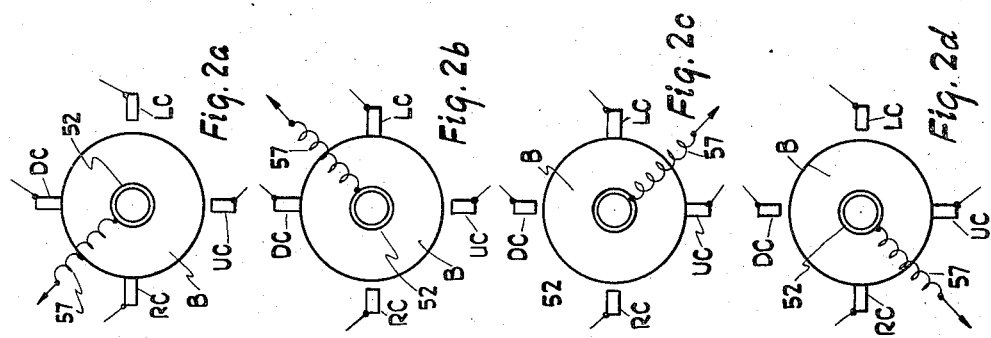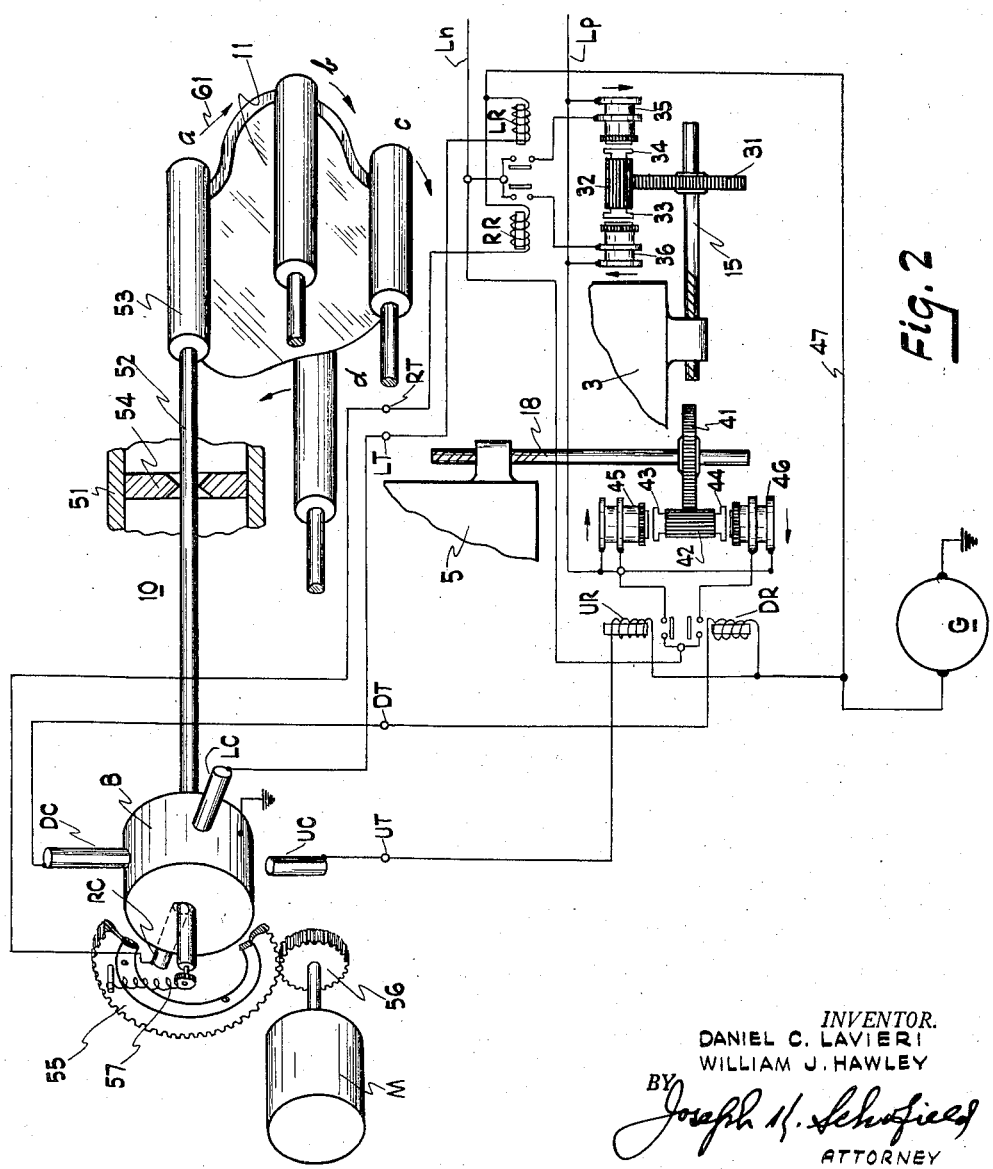

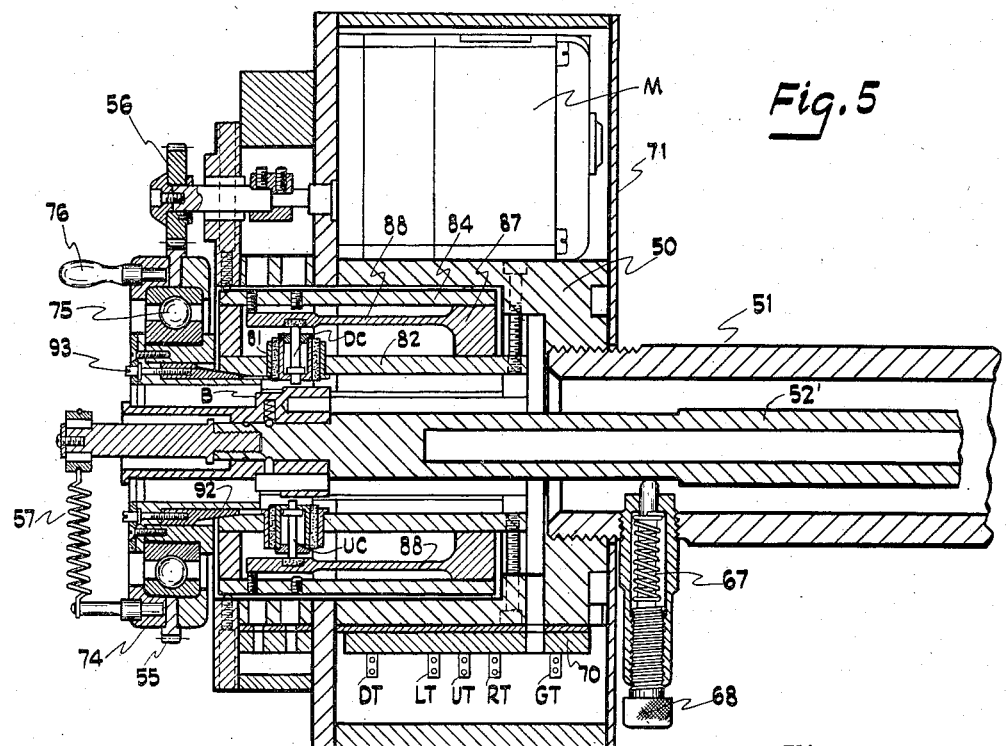
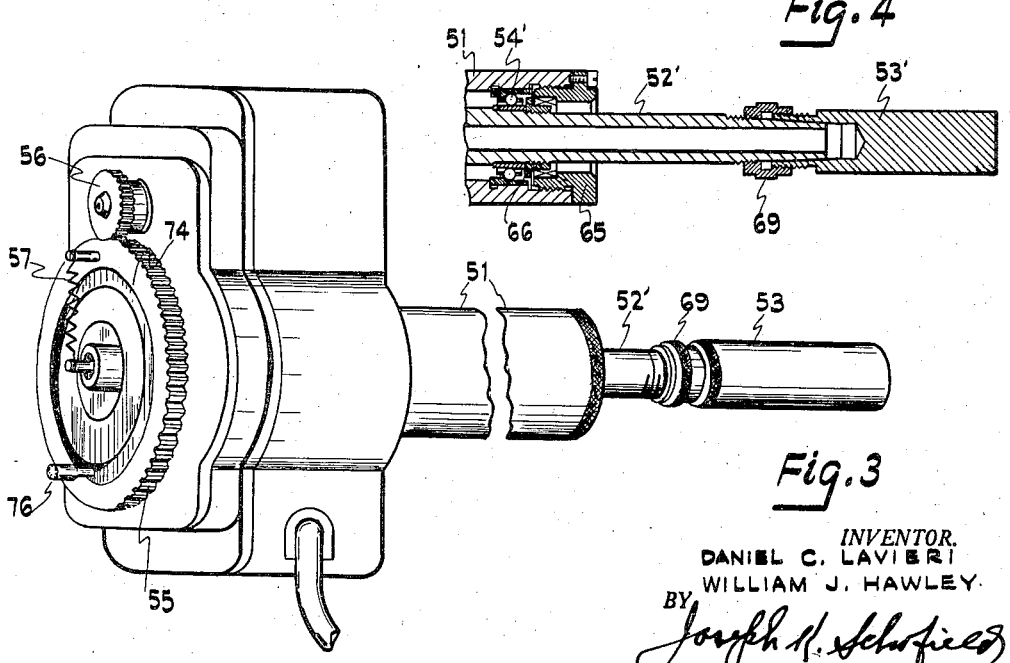

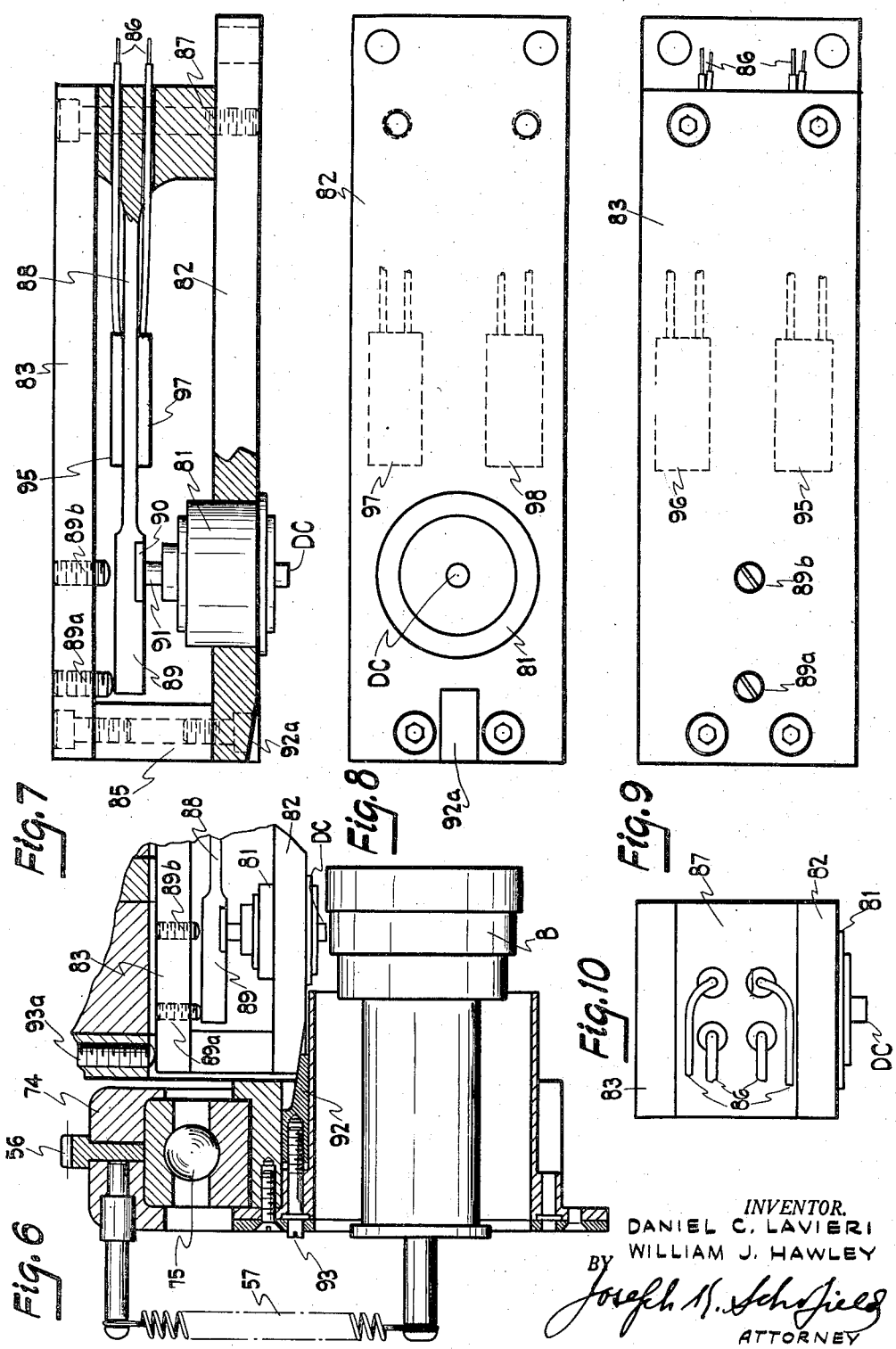

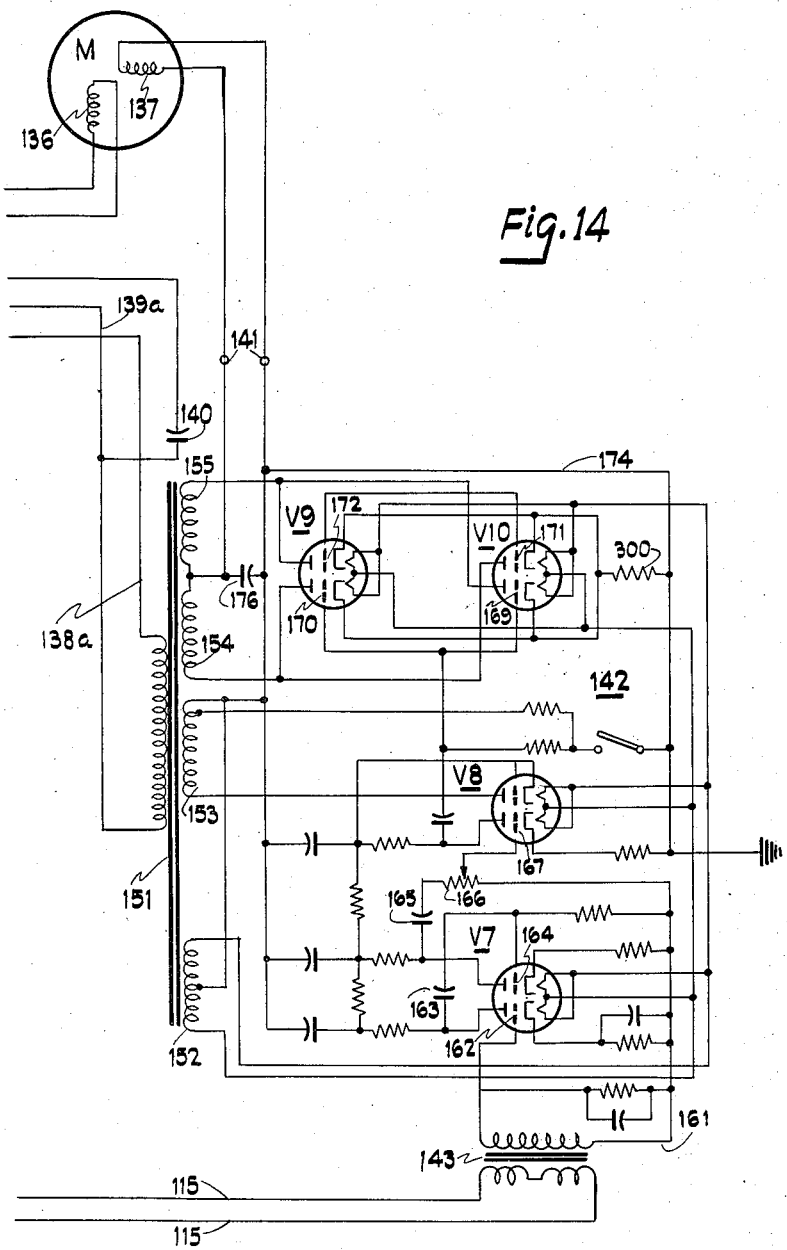

March 31, 1959     D. C. LAVIERI ET AL     2,879,695
TRACER CONTROL FOR PROFILING MACHINE TOOLS
Filed April 23, 1957     8 Sheets-Sheet 8
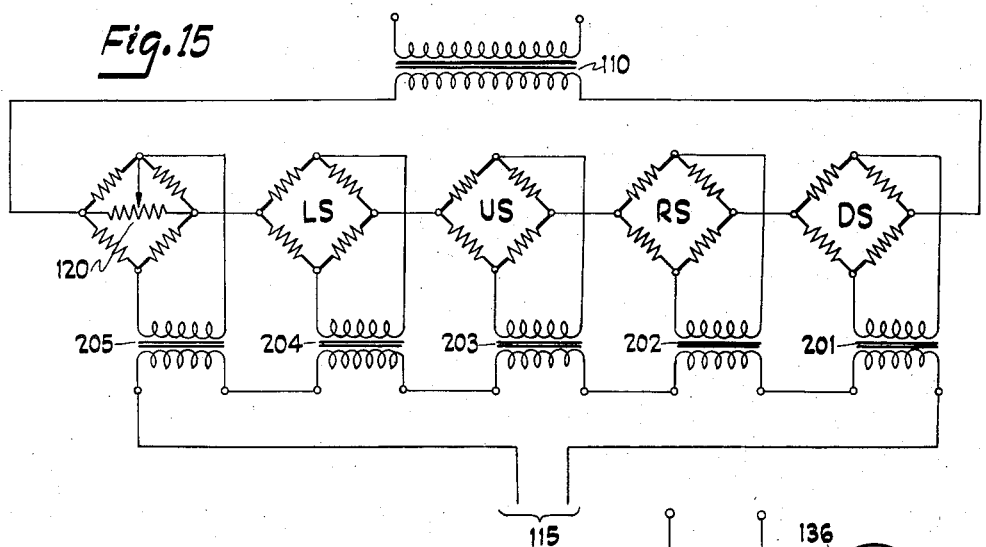
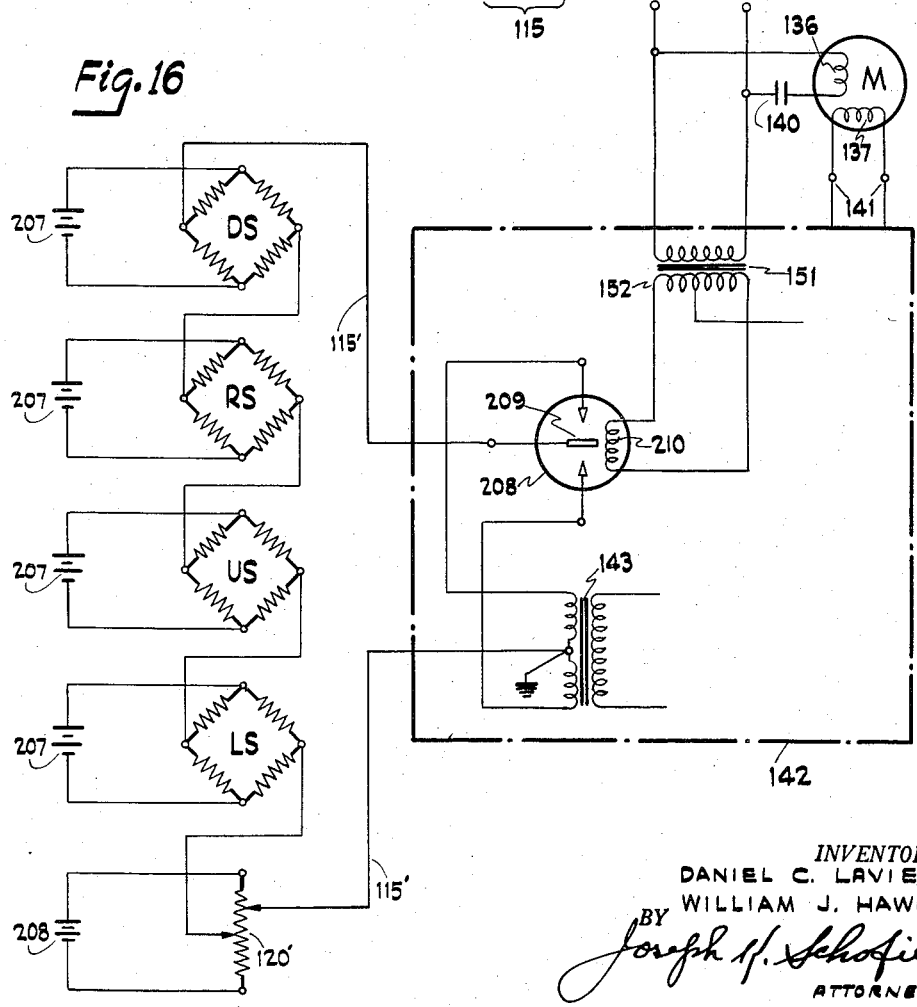
*INVENTOR.*
DANIEL C. LAVIERI
WILLIAM J. HAWLEY
BY
*Joseph J. Schofield*
ATTORNEY

United States Patent Office

2,879,695
Patented Mar. 31, 1959

2,879,695

TRACER CONTROL FOR PROFILING MACHINE TOOLS

Daniel C. Lavieri, Barkhamsted, and William J. Hawley, Farmington, Conn., assignors to Pratt & Whitney Company, Incorporated, West Hartford, Conn., a corporation of Delaware Application April 23, 1957, Serial No. 654,539

8 Claims. (Cl. 90—62)

Our invention relates to apparatus for the automatic control of contour-machining operations in accordance with a template being traced, and is disclosed herein as a continuation-in-part of our copending application Serial No. 437,061, filed June 16, 1954, now Patent No. 2,814,-239, issued November 26, 1957, and assigned to the assignee of the present invention.

More particularly, the present invention, as well as the disclosure of said copending application, relates to contour milling machines wherein the tool-feed motion is controlled by a tracer which, as it travels along the contour of a template, is kept biased against the contour by means of a spring assembly, while a reversible pilot motor controls the spring assembly to vary its biasing direction as required for automatically holding the tracer against the template regardless of any changes in the travelling direction of the tracer point as may be caused by the particular geometric shape of the contour.

According to one of the control principles disclosed and claimed in the copending application, the reversible pilot motor and hence the biasing direction of the tracer spring are controlled in dependence upon the pressure obtaining between the template contour and the tracer point; and it is an object of our present invention to further improve tracer control systems operating on that principle.

More specifically, it is an object of our invention to provide a tracer control system of the above-mentioned type that combines insensitivity to changes in temperature with greatly increased sensitivity to departures of tracer-template pressure from a desired value or range, and that also permits readily adjusting or varying the range of pressures to be automatically maintained between tracer and template.

Another, more specific object of our invention is to provide a tracer assembly for the just-mentioned control purposes that operates with the aid of resistance strain gauges and combines a relatively simple design with the possibility of accurately calibrating the individual gauge units, exchanging them readily for spare units in the event of trouble, and affording good mechanical protection for the gauge units even under rugged operating conditions.

In order to achieve these objects, and in accordance with a feature of our invention, we provide the tracer assembly with a number of strain-gauge units which are peripherally distributed about the tracer spindle and which each comprise a normally balanced network of strain gauges. We further connect all strain-gauge networks to sources of current supply and apply the output of the respective networks in series relation to a single control circuit so that the gauge networks constitute a signal-voltage source in the common control circuit and, at any moment of tracer operation, act cumulatively upon that circuit. In this manner, we impose upon the control circuit a polarity- or phase-reversible signal of variable magnitude which, by means of an amplifier, is applied to the reversible pilot motor for controlling its operation and running direction as needed for changing the force direction of the tracer biasing spring in the desired manner.

According to another feature of our invention, the above-mentioned strain-gauge networks consist each of four individual resistance-wire gauges of equal resistance and equal resistive behavior, the four gauges being loop-connected to form the four branches of a Wheatstone bridge whose input diagonal receives current from the energizing source, and whose output diagonal is connected in series or cumulative relation to the output diagonals of the other bridge networks of gauges. We further mount or cement the four gauges of each network in pairs on two opposite sides respectively of a deflective carrier structure responsive to pressure transmitted from the tracer spindle so that the network becomes unbalanced and furnishes an output voltage when the carrier structure is subjected to deflection.

According to still another feature of our invention, we connect in the control circuit and in series relation to the above-mentioned networks of strain gauges, a potentiometric calibrating device which is energized from a similar current supply as the gauge networks and operates as an additional voltage source in the control circuit. With the aid of such a calibrating device, the resultant voltage impressed upon the control circuit and effective to control the spring-bias directing pilot motor can be set to zero or to any other desired value determining the "zero" condition of the entire bias control system.

The foregoing and other objects, advantages and features of our invention will be apparent from, and will be set forth in, the following description with reference to the embodiments illustrated by way of example on the drawings, in which—

Fig. 2 shows schematically the basic tracer-controlled circuits for operating the vertical and horizontal feed screws of the machine shown in Fig. 1, in conjunction with a schematic and perspective illustration of a tracer assembly according to the invention.

Figs. 2a to 2d are explanatory and relate to the spring-bias effect occurring in a tracer assembly according to Fig. 2.

Fig. 3 is a perspective view of a tracer assembly according to the invention.

Fig. 4 is a longitudinal section through the right-hand portion of the assembly shown in Fig. 3.

Fig. 5 is a longitudinal section through the left-hand or "head portion" of the same tracer assembly.

Fig. 6 shows details, on a larger scale, of the tracer head portion according to Fig. 5.

Fig. 7 is a partly sectional front view of one of four strain-gauge sensing units of the tracer assembly shown in Figs. 3 to 6.

Fig. 8 is a bottom view, Fig. 9 a top view, and Fig. 10 a side view from the right of Fig. 7, of the same sensing unit.

Figs. 13 and 14 show jointly a complete circuit diagram of a tracer-bias control system according to the invention including a tracer assembly of the type illustrated in Figs. 6 to 12; Fig. 13 is to be placed at the left of Fig. 14 so that the interconnecting leads of both illustrations register with each other.

Fig. 15 shows a schematic circuit diagram of a modified control circuit for a system otherwise corresponding to that of Figs. 13 and 14; and Fig. 16 illustrates schematically a circuit diagram of a modified control system operating with direct current.

The same reference characters are used in the various illustrations for respectively similar components.

Figure 1:
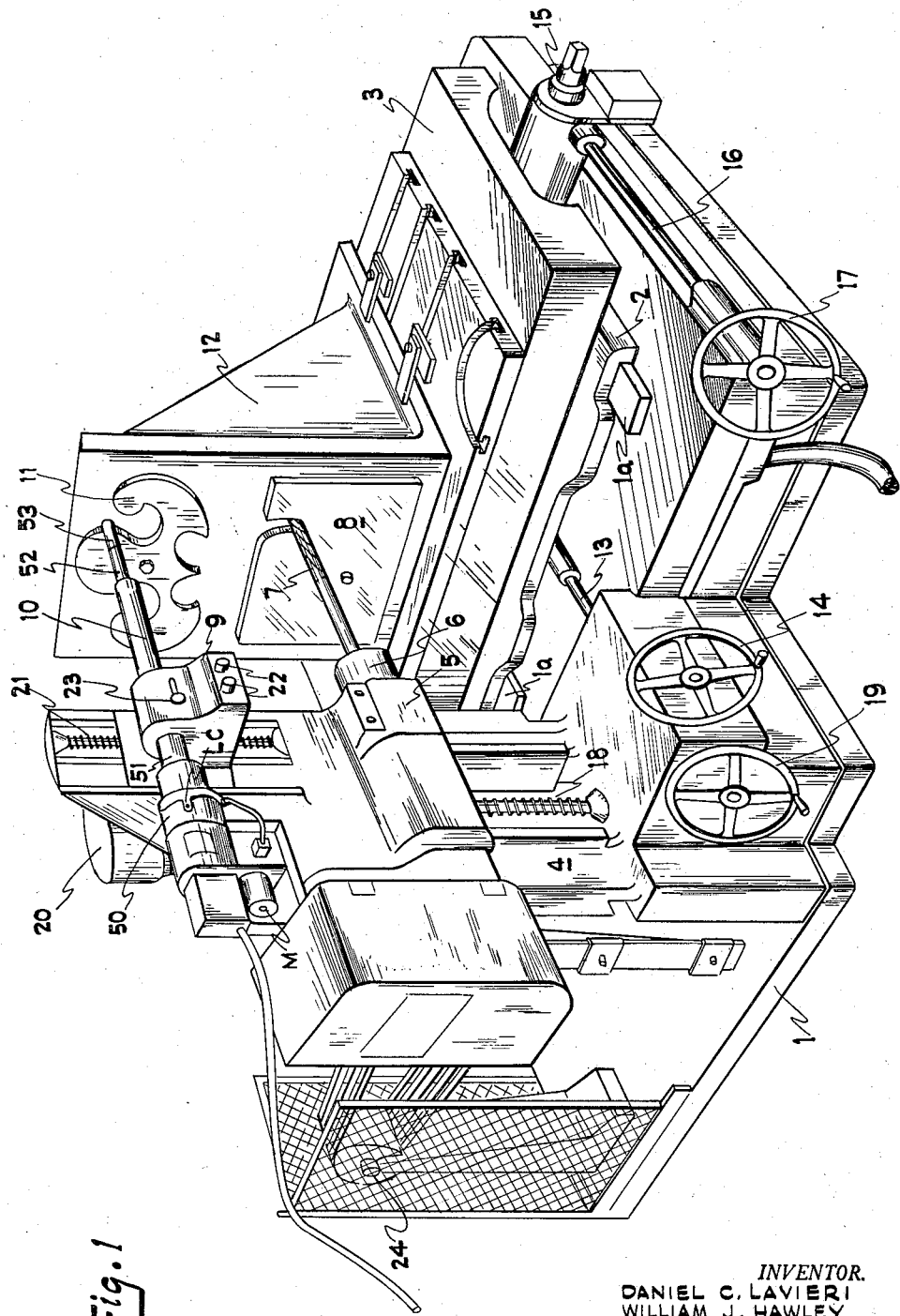
Fig. 1 is a perspective view, from the operator's place, of a milling machine equipped with a contouring tracer assembly according to the invention.

The bed casting 1 of the machine shown in Fig. 1 has slideways 1a on which a transverse slide 2 is displaceable. Slide 2 has horizontal slideways that extend at right angles to those of the bed casting and support a work table 3. An upright column 4 joined with the bed casting 1 forms a third slideway in the vertical direction for a saddle or vertical slide 5. Slide 5 forms a support for the cutter spindle 6 with the cutter 7 for milling a work piece 8. A tracer bracket 9 firmly secures a tracer assembly 10 to the slide 5 so that the tracer axis is parallel to the tool axis. The free end or "point" 53 of the tracer assembly 10 engages the contour of a template 11 whose shape is to be duplicated on the work piece 8 by the milling operation of the cutter 7. The work piece 8 and the template 11 are firmly attached to a holding fixture 12 fastened to the work table 3.

A transverse (in and out) displacement can be imparted to the horizontal slide 2 by means of a feed screw 13 operable by a hand wheel 14. For automatic machine operation, the feed screw 13 may be driven by an electric motor through controllable electromagnetic clutches located behind the work table and not visible in Fig. 1.

The work table 3 can be horizontally displaced at a right angle to the slide 2 by means of a feed screw 15 operable through a shaft 16 by a hand wheel 17. During automatic operation, the feed screw 15 is driven from an electric motor through controllable electromagnetic clutches. This drive, located behind the machine and not visible in Fig. 1, will be more fully described with reference to Fig. 2. The vertical feed motion of the slide 5 carrying the cutter spindle 6 and the tracer assembly 10 is controlled by a feed screw 18 which may be operated by a hand wheel 19. For automatic operation, the screw 18 is driven from an electric motor located at 20 and controlled by electromagnetic clutches also described below with reference to Fig. 2.

The tracer bracket 9 can be vertically displaced relative to the slide 5 by means of a feed screw 21. Further positional adjustments of the tracer relative to the cutter spindle 6 may be made by means of knobs 22 permitting the tracer assembly 10 to be placed in the position best suitable for a particular job. A clamping knob 23 serves to lock the tracer assembly 10 to bracket 9 in the properly adjusted position. The cutter spindle is driven by a transmission 24.

As shown in Fig. 1, the work piece 8 and the template 11 are mounted in a vertical plane parallel to the horizontal direction in which the work table 3 is displaceable by the feed screw 15. Once the machine is properly set up for tracing operation, the in-and-out feed screw 13 need not be operated for the profile tracing operations to be further described in this specification. It should be understood, however, that the illustrated machine and the tracer controls according to the invention are also applicable for three-dimensional work. For instance, when the template is arranged in a plane inclined to the horizontal plane of the work table displacement, then the transverse (in and out) feed screw 13 must also be operated, and this may be done by using a depth tracer in addition to the profiling tracer described in this specification. As to this possibility of three-dimensional work by means of a special depth tracer, the invention does not differ from the prior art, and for that reason the following description is limited to tracing in a vertical plane.

It will be noted that the tracer assembly 10 is moved relative to the bed casting 1 only in the vertical direction, that is, either up or down, while any horizontal feed motion is imparted to the work table 3, and hence to the template 11 and the work piece 8, rather than to the tracer assembly. However, for simplicity, and since it is not essential to the invention how and to what particular parts the component feed movements are applied, reference will be made in the following only to the feed motion of the tracer assembly relative to the template. That is, the terms "up" and "down," "left" and "right," as used hereinafter, designate the movements of the tracer as they appear from the operator's place (Fig. 1) and as if the template were stationary.

As apparent from Fig. 2, the horizontal feed screw 15 for displacing the work table 3 is driven through a spur gear 31 from a pinion 32. Pinion 32 can be selectively coupled by magnetic clutch armatures 33 and 34 with respective magnetic clutches 36 and 35 that are continuously driven by an electric motor (not shown) to revolve in mutually opposed directions. The magnetic clutches are connected to the leads $Lp$ and $Ln$ of a direct-current line (for instance, 110 volts) and are controlled by respective feed-control relays RR and LR. When relay RR is energized, the feed screw 15 is driven to move the tracer assembly 10 to the right. When relay LR is energized, clutch armature 34 is operative to drive the feed screw 15 in the opposite direction, thus moving the tracer assembly 10 relative to the template 11 toward the left.

The feed screw 18 for the vertical feed motion of the slide 5 is driven through a spur gear 41 from a pinion 42 which can be selectively coupled by magnetic clutch armatures 43 and 44 with respective magnetic clutches 45 and 46. Clutches 45 and 46 are driven by an electric motor (not shown) and revolve in mutually opposing directions. The magnetic clutches are connected to the supply line $Lp$, $Ln$ through the contacts of respective feed-control relays UR and DR. When relay UR is energized, clutch members 43 and 45 are effective to drive the feed screw 18 for displacement of the tracer assembly in the upward direction. When relay DR is energized, clutch members 44 and 46 are effective to operate feed screw 18 for downward movement of the tracer assembly.

The four feed-control relays UR, DR, RR and LR are selectively controlled by the operation of the tracer assembly 10. The tracer assembly has a stationary sleeve 51 firmly secured to the bracket 9 (Fig. 1). A tracer spindle 52 extends through the sleeve 51 and carries at its forward end a member called the "tracer point" 53 which has the same diameter as the milling cutter and serves to engage and follow the contour of the template 11. The tracer spindle 52 is pivotally secured to the sleeve 51 by a universal-type pivot bearing 54 (Fig. 2) to permit the spindle to deflect angularly in all directions from the normal, coaxial position.

The tracer sleeve 51 is joined with a coaxial housing portion 50 (Fig. 1) which carries four mutually insulated contacts DC, UC, RC, LC, whose contact points are located in quadrangular relation to one another. Located between the four contacts is a contact block B which forms part of the tracer spindle 52 (Fig. 2). The four tracer contacts are connected to the terminals DT, UT, RT and LT of the respective feed-control relays DR, UR, RR, LR. The other terminals of the relays are connected by a common lead 47 with one pole of a current source G whose other pole is grounded. In some of the available milling machines of the illustrated type, this current source consists of a direct-current generator located in the machine cabinet and supplying a voltage of 12 volts.

Revolvably mounted on the housing 50 (Fig. 1) supporting the contacts UC, DC, LC, RC is a ring 55 (Fig. 2). A pin projecting from ring 55 serves as a holder for one end of an expansible bias spring 57 whose other end is secured to the tracer spindle 52. Spring 57 biases the block B of tracer spindle 52 toward engagement with one or two of the four tracer contacts depending upon the rotational position of ring 55. A reversible pilot motor M is geared to ring 55 and, as will be explained, is automatically controlled to angularly position the ring 55 in response to variation in pressure between the tracer point and the template.

The various angular positions that must be given to the tracer biasing spring 57 during a complete cycle of tracing operation will be understood from the diagrams shown in Figs. 2a to 2d. Assume that in Fig. 2 the tracer point 53 is in position "a" relative to the template 11 and is progressing in the clockwise direction indicated by the arrow 61, the milling tool 7 (Fig. 1) being a "right-hand" cutter and revolving clockwise as seen from the operator's place. Under these conditions (climb milling), the bias spring 57 must impose on the tracer spindle 52 and on the contact block B a force in the direction apparent from Fig. 2a. The spring pulls the contact block B against contacts DC and RC while keeping the block away from contacts LC and UC. This closes the circuits of feed-control relays DR and RR to cause tracer and cutter motion downward and to the right relative to template and work piece. If the down motion forces the tracer point 53 against the template edge sufficiently, the tracer spindle 52 will pivot about the universal pivot bearing 54 and disengage the contact block B from contact DC thereby stopping the downward feed motion. Additional down motion would have forced the contact block to touch contact UC so that upward motion would have taken place. If there had been too much right motion relative to down motion, the tracer point would have left the template. On the other hand, if the bias spring is rotated too far clockwise, there may not be sufficient force to hold the contact block B against contact RC and the tracer and feeds would stall when block B leaves both contacts DC and RC. When the tracer point reaches the position shown in Fig. 2 at b, the bias spring should be positioned as shown in Fig. 2b. For position c in Fig. 2, the corresponding bias spring position is shown in Fig. 2c. For position d of the tracer point (Fig. 2), the proper position of the bias spring 57 is shown in Fig. 2d.

In a control system according to the invention, the task of thus positioning the bias spring is effected automatically by controlling the pilot motor M (Figs. 1, 2) in response to the pressure obtaining between the tracer point and the template contour at any instant or point of tracer progression. However, before turning to a description of the control means provided by our invention for the just-mentioned purpose, a tracer design especially favorable for such control purposes will first be described.

The tracer assembly shown in Figs. 3 to 5 has a sleeve 51 rigidly secured to a head 50 to be firmly mounted on the vertical slide 5 (Fig. 1) of the milling machine. The tracer spindle 52' is mounted in generally coaxial relation to the sleeve 51 by means of a universal pivot bearing 54' which permits the spindle 52' and the tracer point 53' to perform angular movements relative to the tracer sleeve 51, as described in conjunction with Fig. 2. Such movement has the result of placing a contact block B into electric engagement with the feed-control contacts UC, DC, RC and LC of the tracer assembly, also as explained previously.

The spindle 52' is secured to the tracer sleeve 51 by means of a threaded ring 65 which forces an annular spring against a shoulder sleeve 66 of spindle 52' thus holding the shoulder against the universal pivot bearing 54'. The spindle 52' is contacted from below by a resilient member supported by a spring 67 (Fig. 5). The compression of spring 67 can be adjusted by a screw 68 for properly counterbalancing the weight of the tracer spindle 52' and of the masses attached thereto.

The tracer point 53' is separably joined with spindle 52' by a nipple ring 69 which permits substituting the tracer point by one of different diametrical size for readily adapting the tracer to milling cutters of any diameter.

The spindle 52' carries the above-mentioned contact block B (Fig. 5) which cooperates with the mutually insulated contact pins DC, LC, UC, RC of which only the contact pins DC and UC are visible in Fig. 5. The four contact pins, preferably made of copper, are electrically connected with respective terminals DT, LT, UT, RT which are to be connected to the feed control system of the milling machine as shown in Fig. 2 for the same terminals. The terminals are mounted on an insulating base 70 which also carries a grounding terminal GT for block B and may also accommodate the terminals needed for the pilot motor M and transducer unit. The motor and terminals are enclosed by a housing 71 mounted on spindle head 50.

As explained with reference to Fig. 2, the shaft of pilot motor M carries a pinion 56 meshing with a spur gear 55 for controlling the angular position of the tracer bias spring 57. Gear 55 is mounted on a ring-shaped structure 74 (Figs. 5, 6) rotatable on a ball bearing 75 whose inner wall is firmly joined with head 50. The ring structure 74 is provided with a handle 76 for manual control of the spring-bias direction.

Each of the four contact pins is mounted in the manner described presently with reference to contact pin DC as shown in Figs. 5 to 10.

Pin DC is axially displaceable in a guiding sleeve surrounded by an insulated sleeve in a housing 81. Housing 81 is firmly seated in a bore of a rigid bottom plate 82 which forms part of an elongated, prismatic box-like structure 83 (Fig. 7) comprising a rigid top plate 83 and a right-hand end wall 87 with insulated outgoing wires 86 (Fig. 10) for connection of the strain gauges still to be described. This wall 87 is formed by the base portion of a cantilever beam 88 (Figs. 7, 11), preferably made of metal such as stainless steel or aluminum which extends substantially parallel to the tracer axis and has a flat section to permit bending deflection away from the tracer axis. The left-hand end wall 85 completes the rigid box-like structure. The open-sided enclosure structure 83 provides electrical shielding as well as mechanical protection for the strain gauges. The beam 88 has an end portion 89 of greater thickness which carries an insulating insert 90 (Fig. 7) for engagement by the upper end 91 of contact pin DC. A set screw 89a (Figs. 7, 9) is adjustable to lightly force the beam end 89 against the upper end 91 of the pin DC. The amount of the resulting deflection affects the output characteristic and sensitivity of the strain gauge transducer and is used as a means of obtaining similar characteristics for the individual transducer assemblies DS, LS, US and RS in the final equipment. A set screw 89b limits the upward motion of beam 88 due to pressure on pin DC from the contact block B. The equipment may be used with or without the set screw 89a. The use of set screw 89a results in increasing the output of the transducer by amplifying the strain at the location of the gauges as compared to operation with set screw 89a removed. The sense of the output signal is reversed by use of set screw 89a.

A shoulder on pin DC limits its downward motion toward the contact block B. The gap between contact pin DC and block B can be adjusted by means of a wedge 92 (Fig. 6) which engages a cut-out 92a (Figs. 7, 8) in the bottom plate 82 and is displaceable by actuation of a bolt 93 (Fig. 6). The adjusted gap is secured by means of a set screw 93a (Fig. 6).

When contact pin DC is being contacted by block B and thus participates in the above-described feed control operation, it simultaneously imparts bending deflection to beam 88. As soon as the pin moves, the deflective movement of beam 88, constrained by set screw 89a and limited by means of adjustable set screw 89b (Fig. 7), acts upon four straining gauges 95, 96, 97, 98 cemented to beam 88. Gauges 95, 96 are located on top and gauges 97, 98 are on the bottom of the beam as shown in Figs. 7, 8, 9 and 11. They are preferably mounted at a location where any upward deflection of the beam causes a maximum of resistance change.

As explained, each contact pin also acts as a feed control means which initiates the feed motion of the milling tool on electric engagement with the contact block B. A flexible lead (not shown) from contact pin DC is lead out through the open side of the gauge enclosure and is kept away from the gauges and their leads to avoid introducing unwanted signals into the tracer bias control system.

The four strain gauges have the same resistance and are interconnected in loop relation to form the four branches of a balanced bridge network DS (Fig. 13), so that all gauges at the location of tracer contact DC constitute a single unit which is inherently compensated for temperature changes, due to the fact that any temperature-responsive change in resistance acts simultaneously on all four branches of the bridge network and does not affect its balance. However, when the cantilever beam 88 is subjected to bending, the mechanical strain imposed upon the gauges disturbs the bridge balance to produce a control effect explained below.

As mentioned, the strain gauge units at the locations of the other tracer contacts are similar to the one DS just described. These other units or bridge networks of gauges are denoted in Fig. 13 by LS, US, RS, and it will be understood that they are controlled by the respective tracer contact pins LC, US and RC in the same manner as described with reference to contact pin DC and gauge unit DS.

Figure 11:
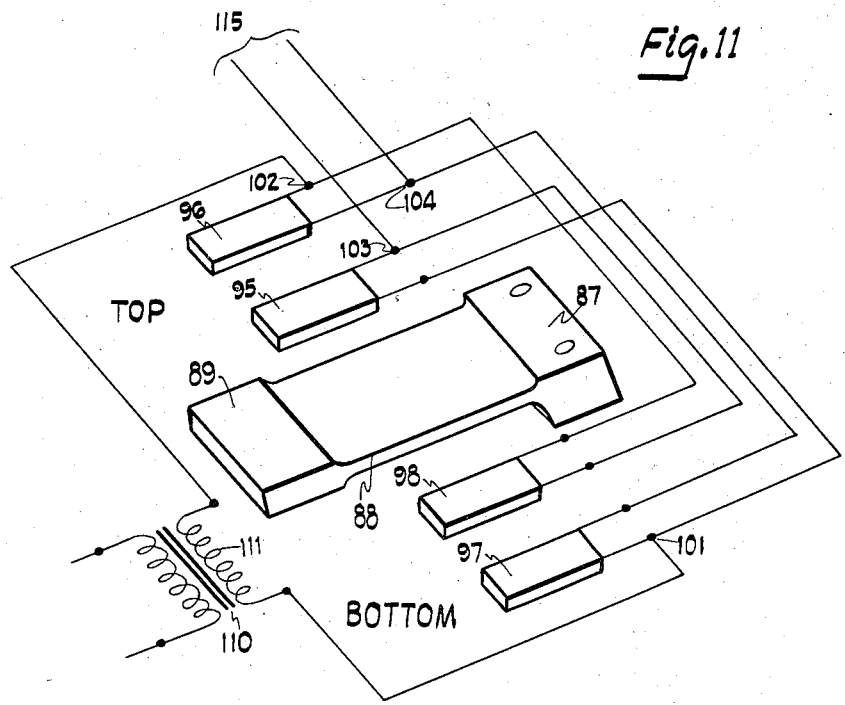
Fig. 11 is a schematic circuit diagram relating to the transducer unit of Figs. 7 to 10.
Figure 13:
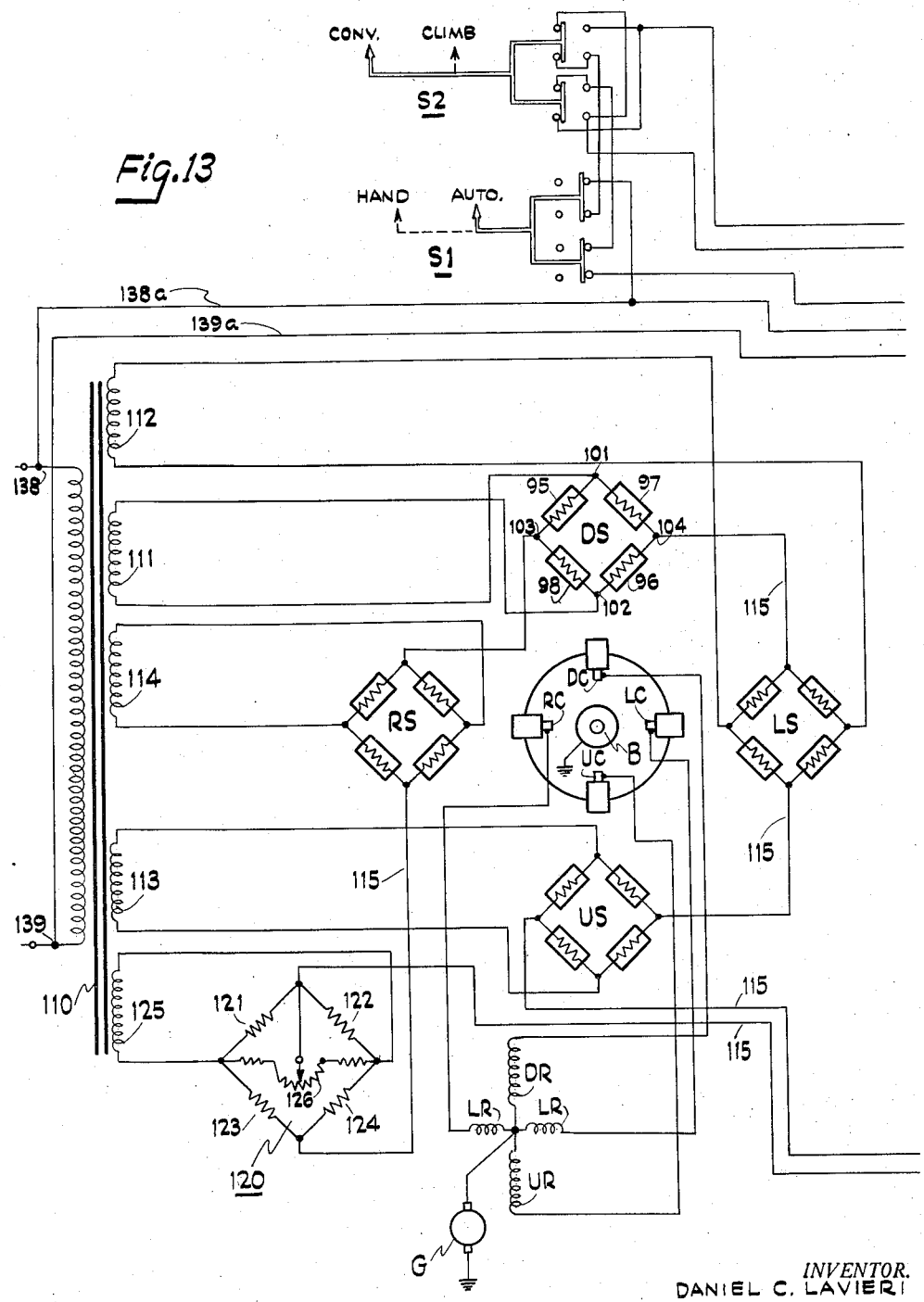

Each bridge network of the gauge units has input diagonal points 101, 102 and output diagonal points 103, 104 as shown for units DS in Figs. 11 and 13. The input diagonal points of unit DS are connected to a secondary winding 111 of a transformer 110 energized from an alternating-current supply line (Figs. 11, 13). The input points of the other three gauge units are energized from further secondary windings 112, 113 and 114, respectively, of the same transformer 110 (Fig. 13). The output diagonals of all four gauge units DS, LS, US, RS are series connected in a control circuit 115 which, as will be described, acts through an amplifier upon the pilot motor M to make the motor run in the direction and by the amount required to position the bias spring 57 to keep the tracer-template pressure within given limits in accordance with the response of the strain-gauge units.

Due to the described interconnection of the individual strain gauges of the bridge networks, the output resulting from the tensioning of the upper gauges is added to the output resulting from the concurrent compression of the lower gauges. As mentioned, changes in resistivity due to temperature variation cancel out; and slight fluctuations in supply voltage are not detrimental.

The control circuit 115, which includes the output diagonals of all four gauge networks, is preferably provided with a potentiometric calibrating device. In the illustrated embodiment the calibrating device 120 comprises a balanceable bridge network of four resistors 121 to 124 having equal resistance. The bridge network is energized from another secondary 125 of transformer 110 and has a potentiometer rheostat 126 connected in its input diagonal. A tapped-off portion of rheostat 126, controllable by the rheostat slider, is serially connected in control circuit 115.

The calibrating device 120 permits adusting the zero signal input to the motor-controlling amplifier for securing the desired pressure range of tracing operation. Before explaining this more in detail, a description of the pilot motor M and the amplifier will be given.

The pilot motor M (Fig. 14) is of the two-phase induction type. It has two field windings 136, 137 placed 90° apart. Winding 136 receives fixed-phase excitation from the terminals 138, 139 of an alternating-current supply line in series with a capacitor 140 under control by two switches S1 and S2 (Fig. 13). When switch S1 is set in Auto position, as shown, the circuit of winding 136 is closed and the system is ready for automatic operation in accordance with the invention. When switch S1 is set to Hand position, the circuit of winding 136 is open and the pilot motor inactive so that the system can be controlled only by actuation of control handle 76 (Figs. 3, 5). In the following description of the machine operation, switch S1 is assumed to be in the illustrated Auto position.

Switch S2 is a reversing switch and has two positions for conventional milling and climb milling, these positions being denoted by Conv and Climb respectively. A change in the setting of switch S2 has the effect of reversing the pilot motor M for any given excitation of motor winding 136. It will be understood that for climb milling (right-hand cutter rotating clockwise and progressing either clockwise around outside curves or counterclockwise around inside curves) as described above with reference to Figs. 2a to 2c, the switch S2 must be set to position Climb, whereas for conventional milling (right-hand cutter rotating clockwise and progressing either counterclockwise around outside curves or clockwise around inside curves), the switch S2 is to be set to position Conv. Both types of milling operation are often used on the same workpiece for roughing and finishing respectively.

Winding 137 of pilot motor M is connected to the output terminals 141 of amplifier 142 to receive alternating current of line frequency whose amplitude depends upon the amplitude of the amplifier input signal and whose phase is 90° leading or 90° lagging the fixed phase current of motor winding 136. For any given connection of motor winding 136 selected by means of switch S2, the motor M will stop when the amplifier input is zero, and will run in one or the other direction depending upon whether the amplifier output voltage at terminal 141 is leading or lagging relative to the line voltage applied to winding 136. Whether the current of the control-phase motor winding 137 lags by 90° or leads by 90° relative to the current of the fixed-phase motor winding 136 depends upon the sense of the input signal to the amplifier which in turn depends upon whether the pressure upon the transducer increases or decreases relative to the pre-set datum level.

The illustrated amplifier 142 (Fig. 14) as such is available on the market as a commercial unit (The Brown Instrument Co., Philadelphia). It is energized through a transformer 151, the primary of which is directly connected to the alternating current line terminals 138 and 139 by leads 138ª and 139ª. Transformer 151 has four secondary windings 152, 153, 154, 155 serving to energize four double triodes V7, V8, V9 and V10. The filament circuits of these four tubes are energized from secondary 152. The three secondaries 153, 154, 155 supply various plate voltages to tubes V8, V9 and V10.

The input signal from control circuit 115 is applied through transformer 143 across the cathode lead 161 and the grid 162 in the first stage of tube V7. The amplified output voltage of the first stage is impressed through a capacitor 163 on the grid 164 of the second amplifying stage also contained in tube V7. The amplified output voltage of the second stage is applied through a capacitor 165 and a gain-control rheostat 166 to the grid 167 of the tube V8, this grid forming part of the third amplifying stage. The other half of the twin tube V8 has its grid and cathode connected with each other and forms a rectifier which is energized from the transformer winding 153 and supplies plate voltage to the above-mentioned three amplifying stages.

The output voltage of the third amplifying stage (first portion of tube V8) is applied to the four grids 169, 170, 171, 172 of the two output tubes V9 and V10. For explaining the functioning of the amplifier, let us first neglect a certain amount of fixed phase shift which will be considered in a later place. The two output tubes V9, V10 form a phase-discriminating power amplifier. Two of the triode sections 169, 172 are energized from across one portion 155 of a center-tapped transformer secondary; and the other two triodes 170, 171 are energized from the other portion 154 of the same transformer secondary. The cathode connections of all four triodes extend through a common cathode resistor 300 through the control field winding 137 of the motor and thence to the center tap of the transformer secondary 154/155. Thus whenever the input signal to the four grids of tubes V9, V10 is in phase with the line voltage, the conduction of two of the triodes with common anodes is increased and the conduction of the other two triodes with common anodes is decreased. Thus there is a net pulse of current passed by the first two triodes which due to the reluctance of field winding 137 and the capacitance of capacitor 176, yields a 60 c.p.s. alternating current in field winding 137 in phase with the line voltage. When the input signal to the four grids is out of phase with the line voltage, the conduction of the first two triodes is decreased whereas the conduction of the second two triodes is increased. This results in a net pulse of current passed by the second two triodes which, due to the reluctance of field winding 137 and the capacitance of capacitor 176, yields a 60 c.p.s. alternating current in field winding 137 which is 180° out of phase with the line voltage. Consequently, the control-field 60 c.p.s. excitation of the two-phase motor is reversed depending upon whether the input signal is in phase or out of phase with the line voltage. As a rseult, the direction of rotation of the motor depends upon the sense of the 60 c.p.s. input signal.

As mentioned above, a certain amount of fixed phase shift occurs in the amplifier. This fixed phase shift is purposely increased by capacitor 176 so that, actually, the output of the amplifier is shifted 90 electrical degrees relative to the line voltage. Hence, the excitation of control field winding 137 in the motor either lags or leads the line voltage by 90°.

Reverting now to the control circuit 115 that supplies input signals to the amplifier input transformer 143, it will be noted that each of the four gauge networks DS, LS, US, RS represents a current source for the control circuit. The four voltages from these sources are counterbalanced to any desired degree by voltage from the calibrating device 120 which is also active as a source in circuit 115. A pressure-responsive change in deflection of any of the cantilever beams each of which carries a network of four gauges causes a change in the output of that network in one or the other sense. The then resulting output voltages of the four networks, as explained, are cumulative, all responding in the same sense to increase in pressure of the contact block since all four have the same phase relation to the line voltage. An increase in the net pressure on the transducers above the reference range as adjusted by the zero calibrating potentiometer 126 will cause a 60 cycle current to flow in the input transformer 143 which will be either in phase or 180° out of phase with the line. A decrease in the net pressure on the transducers below the reference pressure will cause a 60 cycle current through the input transformer 143 which will be 180° out of phase as compared with the current caused by an increase in pressure. The phase relationships are carried through the amplifier with the above-explained result of the bias-spring motor to rotate in one direction in response to increase of pressure on the transducers and to rotate in the opposite direction upon decrease in pressure on the transducers.

When there is no signal, the two sets of triodes 170, 171 and 169, 172 pass equal pulses similar to a full-wave rectifier. This results in a direct current with a 120 c.p.s. ripple which is not effective to drive the motor but rather has a damping effect tending to prevent overshooting as the balance point is reached. This damping current increases with decreasing signal thus improving stability.

Figure 12:
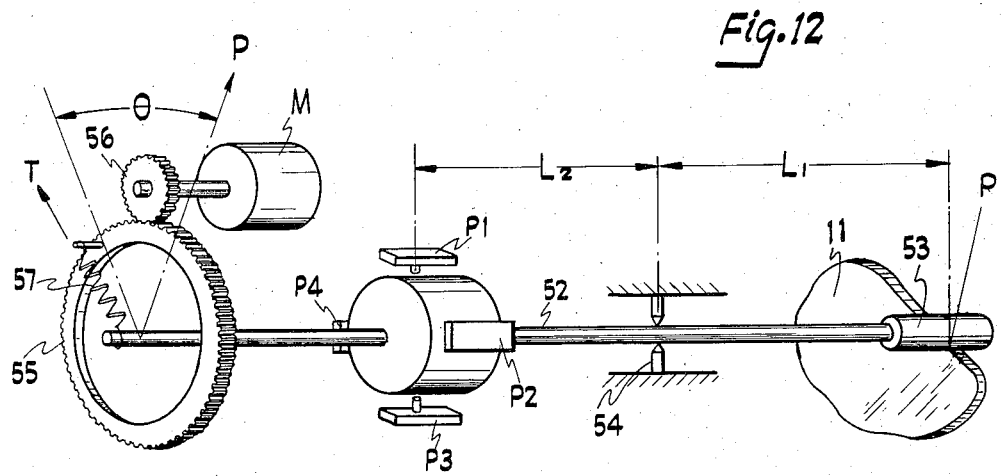
Fig. 12 is an explanatory diagram of the tracer assembly shown in Fig. 2.

As described, the sensing of the pressure between the tracer point and the template is accomplished indirectly by locating the strain-gauge transducers at the contact points. The relation between the pressure of the tracer point on the template and the pressure acting upon the transducers is roughly, but satisfactorily expressed by the approximation:

$$P = [T \cos \theta - (p_1 + p_2 + p_3 + p_4)] \frac{L_2}{L_1}$$

wherein, with reference to the diagram of Fig. 12:

$P$ = pressure of tracer point on template
$T$ = bias spring tension
$\theta$ = lag angle of the bias spring
$p_1, p_2, p_3, p_4$ = positive pressures on respective transducer units
$L_1$ = distance from tracer-template engagement to pivot-point of universal bearing (54 in Fig. 2)
$L_2$ = distance from pivot point (54) to contact points of block B When the above-mentioned zero adjustment is being made, there is some positive pressure ($P = p_1, p_2, p_3$ or $p_4$) between contact block B and at least one of the four contacts DC, LC, UC, RC. For starting the operation of the tracer control, we select a suitable combination of bias spring tension T, lag angle $\theta$, and pressure P. This is done by adjusting the calibrating device 120 so that for the chosen original pressure P, the electric controls are set to "zero." This electrical "zero" setting results in zero bias spring rotation whenever the chosen pressure is experienced. That is, any departure from this original pressure, as interpreted by the electrical system, will cause the bias spring motor to rotate the bias spring forward or backward as required to restore the pressure to the original chosen value. As explained above, this is the primary requirement to keep the tracer progressing around the template without stalling or leaving the template.

While we prefer locating the strain gauge units in the vicinity of the tracer contacts that operate to control the feed motion of the milling machine, the gauge units may also be located elsewhere. In such cases, the gauge units may be operated by pressure-transmitting means other than the electric contacts used in the feed-control circuits of the milling machine. When actuating the pressure-responsive gauges by means other than the feed-control devices, a different number of gauge units, for instance three gauge units spaced 120° apart, can be used. It will further be recognized that the invention is not limited to electric feed control of the milling machine, but that the strain-gauge units will operate in the same manner when used in connection with a hydraulic feed control system.

Various modifications are likewise available with respect to the electric control circuits of a system according to the invention. For instance, while in the embodiment described with reference to Figs. 13 and 14 the gauge units are separately energized by individual secondary windings of a transformer the input circuits of the strain-gauge networks DS, RS, US, LS, as well as the calibrating device 120 may be directly connected in series relation to an alternating-current supply as is schematically illustrated in Fig. 15. In such cases the outputs of the strain-gauge networks and the calibrating device must be isolated before totalizing them, for instance by separate transformers 201, 202, 203, 204 and 205 in Fig. 15. It will be understood that the control circuit 115 according to Fig. 15 may be connected through an amplifier to the pilot motor in the manner shown in Figs. 13 and 14.

Strain-gauge networks as used according to the invention operate equally well with alternating current or direct current. Fig. 16 shows schematically the example of a direct-current control circuit. The gauge networks DS, RS, US, LS have their input diagonals individually energized from respective direct-current sources 207. The output diagonals are all series connected in a control circuit 115' which comprises a zero-calibrating potentiometer rheostat 120' and generally corresponds to the control circuit 115 described above with reference to Figs. 13 and 14. Rheostat 120' is energized from a separate D.-C. source 208. The control circuit 115' is connected through a vibratory converter 208 with the signal input transformer 143 of an amplifier 142 which, aside from the added converter 208, is identical with the one shown in Fig. 14 and described above and for that reason is only partly illustrated in Fig. 16. The converter 208 has its vibratory contact 209 actuated by an excitation coil 210 energized at the line frequency from the secondary 152 of the same power transformer 151 that energizes the rest of the amplifier. The direct-current signal supplied by circuit 1151 is translated by converter 208 into an alternating current of the line frequency which causes the amplifier 142 to control the spring-bias motor M in the same manner as described above with reference to Figs. 13 and 14.

It will be understood from the foregoing by those skilled in the art, that our invention permits of a great variety of modifications in mechanical as well as electrical respects and therefore may be embodied in apparatus other than those specifically illustrated and described herein, without departing from the essential features of our invention and within the scope of the claims annexed hereto.

We claim:

1. Tracer apparatus for controlling the tool feed of a profiling machine tool in accordance with the contour of a template being traced, comprising a tracer assembly having a support and having feed control means mounted on said support, said tracer assembly having a tracer member engageable with the template contour and deflectable relative to said support, a spring assembly rotatable on said support and having spring means connected with said tracer member for biasing said member toward the contour, said member being engageable with said feed control means for operating said feed control means in dependence upon deflection of said member, a motor connected with said spring assembly for rotating said assembly to thereby change the spring bias direction, a control system connected with said motor and comprising a plurality of pressure sensing means distributed about the axis of said tracer assembly and responsive to variations in pressure between said tracer member and the template, each of said sensing means having a balanceable bridge network of four resistance-wire strain gauges loop-connected with each other, said bridge network having an input diagonal and an output diagonal, current supply means connected to said input diagonals of said networks, a control circuit including all said output diagonals in series connection so as to be energized jointly from said strain-gauge networks, and means electrically connecting said control circuit with said motor, whereby said motor is controlled in dependence upon said pressure variations to change said spring bias direction for maintaining said tracer member in engagement with the template contour.

2. A tracer apparatus for controlling the tool feed of a profiling machine tool in accordance with the contour of a template being traced, comprising a tracer support having four coordinately arranged feed control devices, a tracer member deflectably mounted on said support and having a tracer point engageable with the template contour and a part engageable with any two sequential ones of said control devices to operate them depending upon the deflecting direction of said tracer member, a spring assembly rotatable on said support and having spring means connected with said tracer member for biasing said point toward the contour, a motor connected with said spring assembly for rotating said assembly to thereby change the spring bias direction, a control system comprising four pressure-responsive sensing devices mechanically connected with said four feed control devices to operate in dependence upon pressure exerted by said part upon said feed control devices, each of said sensing devices comprising four resistance strain gauges loop-connected with each other and forming a balanceable bridge network having an input diagonal and an output diagonal, current supply means connected with said input diagonals, and a control circuit connected with said motor and including said four output diagonals in series relation to each other to receive bridge-unbalance voltages from said respective networks, whereby said pressure-responsive sensing devices control said motor to vary said spring bias direction for maintaining said point in engagement with the contour.

3. Tracer apparatus for controlling the tool feed of a profiling machine tool in accordance with the contour of a template being traced, comprising a tracer support, a tracer member engageable with the template contour and deflectable relative to said support, a spring assembly rotatable on said support and having spring means connected with said tracer member for biasing said member toward the contour, a motor connected with said spring assembly for rotating said assembly to thereby change the spring bias direction, a control system connected with said motor and comprising a plurality of pressure sensing means distributed about the axis of said tracer member and responsive to variations in pressure between said tracer member and the template, each of said sensing means comprising a structure having a fixed base portion and being deflective relative to said base portion, each of said sensing means having a balanceable bridge network of resistance strain gauges firmly mounted on opposite sides of said structure to be strained in compression and expansion respectively when said structure is deflected, pressure transmitting means mounted between said tracer member and said structures for deflecting said structures in response to deflection of said tracer member, current supply means, said gauge networks having respective primary sides connected to said current supply means, a control circuit, said gauge networks having respective secondary sides all series connected in said control circuit and forming respective voltage sources in said control circuit, and means electrically connecting said control circuit with said motor, whereby said motor is controlled in dependence upon said pressure variations to change said spring bias direction for maintaining said tracer member in engagement with the template contour.

4. Tracer apparatus for controlling the tool feed of a profiling machine tool in accordance with the contour of a template being traced, comprising a tracer support having a tracer member engageable with the template contour and deflectable relative to said support, a spring assembly rotatable on said support and having spring means connected with said tracer member for biasing said member toward the contour, a motor connected with said spring assembly for rotating said assembly to thereby change the spring bias direction, a control system connected with said motor and comprising a plurality of pressure sensing means distributed about the axis of said tracer member and responsive to variations in pressure between said tracer member and the template, each of said sensing means comprising a cantilever beam extending substantially parallel to the axis of said tracer member, said beam having one end rigidly mounted and being deflective relative to said end, each of said sensing means having a balanceable bridge network of resistance strain gauges firmly mounted on opposite sides of said beam to respond to deflection thereof, respective pressure transmitting members extending substantially radially of said tracer member between said tracer member and said respective beams for deflecting said beams in response to deflection of said tracer member, current supply means, said gauge networks having respective primary sides connected to said current supply means, a control circuit, said gauge networks having respective secondary sides series connected in said control circuit and forming respective voltage sources in said control circuit, and means electrically connecting said control circuit with said motor, whereby said motor is controlled in dependence upon said pressure variations to change said spring bias direction for maintaining said tracer member in engagement with the template contour.

5. A tracer assembly for controlling the tracer-and-tool feed in profiling machine tools in accordance with the contour of a template being traced, comprising a tracer support, a tracer spindle having a universal pivot junction with said support to be deflectable relative to said support, four coordinately arranged feed control contacts mounted on said support and being displaceable radially of said spindle, said spindle being engageable with said contacts for selectively engaging said contacts electrically and displacing them in dependence upon the deflecting directions of said spindle, a structure rotatable relative to said support and having spring means connected with said tracer spindle for biasing said tracer part toward the template contour, a motor mounted in fixed relation to said support and drivingly connected with said structure for rotating it to thereby vary the biasing direction of said spring means, four sensing units each having a base plate mounted on said support, said base plate having guide means in which one of said respective feed control contacts is displaceably guided, a deflective beam structure secured to said base plate and bendingly deflective relative thereto, said beam structure being mechanically joined with said one contact to be deflected thereby, a network of four strain gauges mounted in pairs on opposite sides respectively of each of said respective beam structures whereby said network becomes unbalanced due to deflection of said beam structure, input terminals connected with said networks for supplying electric current thereto, and output terminals to which said networks are serially connected to provide signal voltage.

6. In a tracer assembly according to claim 5, said base plate being radially adjustable relative to said tracer support, and controllable setting means engaging said base plate for adjusting the radial spacing of said contact and beam structure from said spindle.

7. In a tracer assembly according to claim 5, said beam structure consisting of a cantilever having one end firmly secured to said base plate and having the other end engageable by said contact to be deflected thereby, and each of said sensing units having adjustable stop means engageable by said other end for limiting the deflection of said cantilever.

8. In a tracer assembly according to claim 5, said beam structure having one end rigidly secured to said base plate, said sensing unit having stop means engageable by the other end of said beam structure to prevent deflection of said other end away from said spindle, and said beam structure being engageable by said contact at a point between said two ends but closer to said other end so as to be deflected to arcuate shape when stressed by said contact.

References Cited in the file of this patent
UNITED STATES PATENTS

| | | |
|---|---|---|
| 1,588,856 | Shaw | June 15, 1926 |
| 2,814,239 | Lavieri et al. | Nov. 26, 1957 |

FOREIGN PATENTS

| | | |
|---|---|---|
| 512,234 | Great Britain | Aug. 30, 1939 |
| 759,699 | Great Britain | Oct. 24, 1956 |
| 759,701 | Great Britain | Oct. 24, 1956 |
| 1,121,579 | France | May 7, 1956 |